United States Patent [19]
Whitehead

[11] Patent Number: 5,450,498
[45] Date of Patent: Sep. 12, 1995

[54] HIGH PRESSURE LOW IMPEDANCE ELECTROSTATIC TRANSDUCER

[75] Inventor: Lorne A. Whitehead, Vancouver, Canada

[73] Assignee: The University of British Columbia

[21] Appl. No.: 91,009

[22] Filed: Jul. 14, 1993

[51] Int. Cl.6 .............................................. H04R 25/00
[52] U.S. Cl. .................................... 381/191; 381/174
[58] Field of Search ............... 381/191, 113, 116, 174, 381/168; 29/594

[56] References Cited

U.S. PATENT DOCUMENTS

| | | |
|---|---|---|
| 3,118,979 | 1/1964 | Sessler et al. . |
| 3,544,733 | 12/1970 | Reylek et al. . |
| 3,944,759 | 3/1976 | Penning ................................ 381/191 |
| 3,980,838 | 9/1976 | Yakushiji et al. ..................... 381/191 |
| 4,081,626 | 3/1978 | Muggli et al. . |
| 4,093,884 | 6/1978 | Dreyfus et al. . |
| 4,160,881 | 7/1979 | Smulders . |
| 4,160,882 | 7/1979 | Driver . |
| 4,246,449 | 1/1981 | Biber . |
| 4,249,043 | 2/1981 | Morgan et al. . |
| 4,419,545 | 12/1983 | Kuindersma . |
| 4,434,327 | 2/1984 | Busch-Vishiac et al. . |
| 4,439,642 | 3/1984 | Reynard . |
| 4,632,856 | 12/1986 | Marcus et al. . |
| 4,670,339 | 6/1987 | Frey . |
| 4,730,283 | 3/1988 | Carlson et al. . |
| 4,796,725 | 1/1989 | Katayama . |
| 4,885,783 | 12/1989 | Whitehead et al. . |
| 4,887,248 | 12/1989 | Griebeler . |
| 5,018,203 | 3/1991 | Sawyers et al. . |
| 5,191,791 | 3/1993 | Gerardi et al. . |

FOREIGN PATENT DOCUMENTS

| | | |
|---|---|---|
| 144234 | 6/1985 | European Pat. Off. . |
| 892773 | 10/1953 | Germany . |
| 3228939 | 11/1983 | Germany . |
| 1532008 | 11/1978 | United Kingdom . |
| WO92/10070 | 6/1992 | WIPO . |

OTHER PUBLICATIONS

"On the Acoustical Resistance Due to Viscous Losses in the Air Gap of Electrostatic Transducer", Skvor, Acoustica, vol. 19, 1968, pp. 295–299.

"Audio and Ultrasonic Transducer Based On Electro-thermomechanical Film (ETMF)", Backman et al, Proc. IEEE Intl. Conf. on Acoustics, Speech and Signal Processing, V. 2, pp. 1173–1176, 1990.

*Primary Examiner*—Curtis Kuntz
*Assistant Examiner*—Huyen D. Le
*Attorney, Agent, or Firm*—Oyen Wiggs Green & Mutala

[57] ABSTRACT

An electrostatic transducer in which two sheets are separated by a gas-filled gap. The sheets have conductive surfaces for imposing electric fields within the gap when an electrical potential is applied across the sheets. A flexible positioning mechanism between the sheets maintains the gap at a desired time-averaged thickness. The gap is made up of a plurality of thick regions and a plurality of thin regions. Both regions have a total projected area which is a substantial portion of the total area of one of the sheets. The average thickness of the gap in the thick regions is at least ten times greater than the gap's average thickness in the thin regions. The electrostatic field energy of the electric fields is concentrated in the thin regions.

17 Claims, 4 Drawing Sheets

HIGH PRESSURE LOW IMPEDANCE ELECTROSTATIC TRANSDUCER

FIELD OF THE INVENTION

This application pertains to an electrical-to-mechanical transducer in which displacement is caused by a force of attraction between approximately parallel conductive surfaces, with the surfaces being structured to yield low mechanical impedance and allow high electrostatic pressures.

BACKGROUND OF THE INVENTION

Conventional electrostatic transducers, such as those used in certain loudspeakers, employ air gaps between conductive plates. The gap size in such transducers is reasonably large: typically in the range of 0.3 to 3 mm. Such transducers can be made using very thin film conductive sheets, for example a vacuum, deposited layer of aluminium on a very thin polymeric substrate such as polyester film. It is a fairly straightforward matter to design such transducers to provide a good impedance match to air. That is, the mechanical impedance associated with oscillations of the mass of the conductive sheets, and the mechanical impedance associated with the restorative force holding the sheets in place, is low compared to the mechanical impedance of air, so that most of the mechanical power of the transducer is conducted away as sound. Furthermore, such transducers can lend themselves to reasonably efficient conversion of electrical power to mechanical power, provided that the magnitude of the oscillation of the conductive sheets is a reasonable fraction of the size of the gap, which is often the case.

A fundamental difficulty with prior art electrostatic transducers like those described above is that they are incapable of providing large electrostatic pressures. That is, the quantity of force per unit area cannot be very large. This is because the electrostatic force per unit area in such transducers is given by the formula:

$$F/A = P = \tfrac{1}{2} \epsilon_0 E^2 \qquad (1)$$

where $\epsilon_0$ is $8.85 \times 10^{-12}$ farads per metre and E is the magnitude of the electric field in the gap between the two conductive surfaces. For macroscopic gaps of the type described above, there is a maximum value of E, essentially independent of gap size, which is approximately $10^6$ volts per metre for room pressure air. This corresponds to a maximum electrostatic pressure of approximately 4.4 N/m$^2$ or 0.00066 PSI. There are many applications where such forces are too low.

Recently, as described in U.S. Pat. No. 4,885,783 (Whitehead et al), practical methods have been devised for constructing electrostatic transducers employing very small air gaps (i.e. less than 10 micrometres) in which the breakdown field of air is substantially higher, due to the inhibition of avalanche breakdown from free ions, which is in turn due to the proximity of solid surfaces relative to the mean free path of a free ion in the gas. In such transducers a uniformly structured surface of elastomeric material creates air pockets of the desired size against a metal plate. Because the material is elastomeric it allows a reasonable amount of flexibility in the separation of the transducer's plates.

Such transducers are able to achieve pressures in the range of 100 to 1,000 times greater than conventional electrostatic transducers, and they are practical for certain applications where it is desirable to couple vibrational energy into media having an intermediate level of mechanical impedance, such as water, sand, soil, etc. However, the mechanical impedance of such transducers is too high to efficiently produce mechanical vibration in air. That is, most of the mechanical power of the transducer is associated with overcoming internal impedance, rather than in radiating mechanical energy into air. The transducer's higher impedance is partially due to the stiffness of the surface of the elastomeric material, but is predominately due to the difficulty of compressing the very shallow air pockets in the structure. Although air is compressible, the stiffness of an air gap is inversely proportional to the gap's thickness. For the small gap thicknesses characterizing transducers exemplified by U.S. Pat. No. 4,885,783 the resultant high stiffness becomes a significant problem. A further disadvantage of such devices is that it is often difficult to concentrate most of the electrostatic field energy in the active air gap, since generally speaking the elastomeric material is substantially thicker than the air gaps (pockets) in the surface of the material.

The present invention provides a transducer which can concentrate most of its electrostatic field energy in the active region of air gaps. The air gaps are small enough to achieve very high breakdown fields, and the structure is designed to reduce the high mechanical stiffness encountered in compressing narrow air gaps.

One specific requirement for producing acoustic excitation in air is in the field of aerodynamic flow. There is evidence that the characteristics of air flow over a rigid surface such as an airplane wing can be substantially modified by acoustic excitation. It would be highly desirable to employ a thin sheet transducer which could be easily applied to the surface of a structure such as a wing, to efficiently cause acoustic excitation of the air flowing over the surface. The prior art discloses no transducers capable of producing displacements of order several microns at frequencies of order 10 kilohertz, with efficiencies of order 1%. Such characteristics are highly desirable. It is a further object of this invention to fulfil this gap in the prior art.

SUMMARY OF THE INVENTION

In accordance with the preferred embodiment, the invention provides an electrostatic transducer in which two sheets are separated by a gas-filled gap. The sheets have conductive surfaces for imposing electric fields within the gap when an electrical potential is applied across the sheets. A flexible positioning means between the sheets maintains the gap at a desired time-averaged thickness. The gap is made up of a plurality of thick regions and a plurality of thin regions. The thin regions have a total projected area which is a substantial portion of the total area of one of the sheets. The thick regions also have a total projected area which is a substantial portion of the total area of one of the sheets. The average thickness of the gap in the thick regions is at least ten times greater than the gap's average thickness in the thin regions. A means is provided to concentrate the electrostatic field energy of the electric fields in the thin regions.

The flexible positioning means is preferably an elastomeric material. Advantageously, one of the sheets may be formed of an elastomeric material bearing a conductive coating, the coating having a thickness less than that which would significantly impede the sheet's flexibility.

A means may be provided to equalize the gas pressure in the gap with the gas pressure external to the transducer, at frequencies substantially below the transducer's intended operating frequency range.

The conductive surface on at least one of the sheets may be coated with a thin ceramic to electrically isolate the surface from the gap.

The gap thickness in the thin regions is preferably less than or equal to the Paschen minimum distance for the gas and the gas pressure in the gap.

The sheets have a component $z_{gas}$ of net mechanical impedance per unit area due to pressure changes required to compress and rarefy the gas within the gap; and, a component $z_{mass}$ of net mechanical impedance per unit area due to the sheets' mass. The gap thickness in the thick regions is sufficiently large that the magnitude of $z_{gas}$ is of the same order as, or less than the magnitude of $z_{mass}$ at frequencies within the transducer's intended operating frequency range.

The width of the individual thin regions is less than the width at which the viscosity or inertia of gas flow into or out of the thin regions would substantially increase the transducer's net mechanical impedance per unit area at frequencies within the transducer's intended operating frequency range.

The positioning means has a net mechanical impedance per unit area $z_{pos}$, the magnitude of which is of the same order as, or less than the magnitude of $z_{mass}$ for frequencies within the transducer's intended operating frequency range.

DETAILED DESCRIPTION OF THE PREFERRED EMBODIMENT

Figure 1:
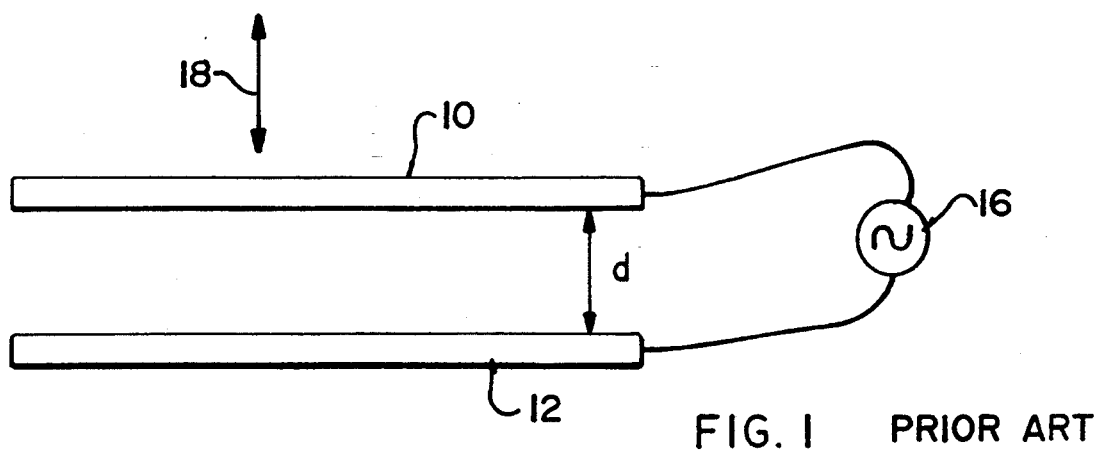
FIG. 1 is a simplified cross-sectional illustration of a prior art electrostatic transducer.

FIG. 1 is a simplified cross-sectional view of a conventional electrostatic transducer consisting of a pair of opposed metal plates 10, 12 which are separated a distance "d" by an air gap. If an A.C. voltage source 16 is connected across plates 10, 12 to establish an electrical potential difference across the plates an electrostatic force is generated which causes the plates to oscillate in the direction indicated by double-headed arrow 18. The magnitude of such oscillation varies in proportion to the magnitude of the square of the applied voltage. There is a maximum breakdown voltage of about $10^6$ volts per meter beyond which any further increase in voltage across plates 10, 12 results in arcing between the plates, in which case the transducer fails due to a large increase in the flow of electrical current.

Figure 2:
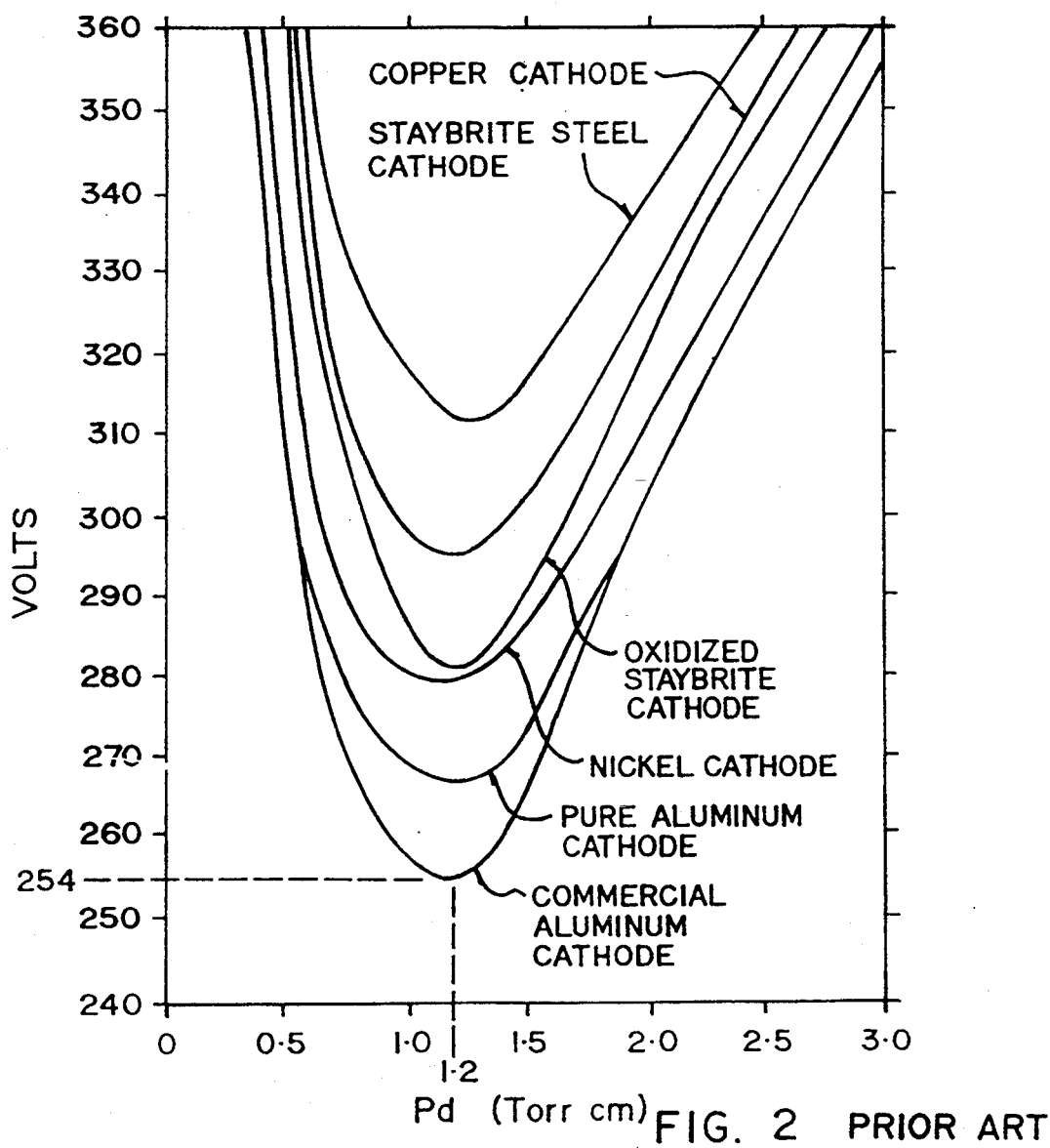
FIG. 2 is a graph which illustrates the relationship between breakdown voltage "V", plate separation distance "d" and pressure "P" of a gas maintained between the opposed plates of an electrostatic transducer like that shown in FIG. 1.

FIG. 2 is a graph which illustrates the relationship between breakdown voltage "V", plate separation distance "d" and pressure "P" of a gas maintained between the opposed plates of an electrostatic transducer like that shown in FIG. 1. The graph shows that for a given cathode material (the "cathode" being the plate having the lower voltage) such as commercial aluminium, the breakdown voltage V decreases as the product Pd decreases, until a minimum voltage "$V_{min}$" is reached; and, that the breakdown voltage V then increases dramatically as the product Pd continues to decrease. It may thus be seen that if the gas pressure P is held constant, the breakdown voltage V decreases as the plate separation distance d decreases until the aforementioned minimum voltage $V_{min}$ (known as the "Paschen minimum") is reached, but the breakdown voltage V then increases dramatically as the plate separation distance d is further decreased. As FIG. 2 indicates, the Paschen minimum voltage for air, with a commercial aluminium cathode, is about 254 volts, and occurs when the product Pd is about 1.2 Torr cm. If the gas pressure P is 1 atmosphere (i.e. 760 Torr) this corresponds to a plate separation distance d of about 1.2 Torr cm./760 Torr=$1.6\times10^{-3}$ cm. or about 16 microns.

It has been recognized that an electrostatic transducer capable of measuring small displacements can be made by making d as small as possible. [See: W. B. Gauster and M. A. Breazeale: "Detector for Measurement of Ultrasonic Strain Amplitudes in Solids", Rev. Sci. Instrum. 37, 1544–1548 (1966); and, J. H. Cantrell and J. S. Heyman: "Broadband Electrostatic Acoustic Transducer for Ultrasonic Measurements in Liquids", Rev. Sci. Instrum. 50, 31–33 (1979)]. Unfortunately however, it is very difficult to construct a practical electrostatic transducer having a plate separation gap "d" of only about 16 microns and the difficulty increases as "d" is further decreased (as it must be if an electrostatic transducer having higher breakdown voltages is to be produced). Expensive precision machining and cumbersome mounting techniques are required which preclude the use of such transducers in most practical situations.

As disclosed in U.S. Pat. No. 4,885,783 (Whitehead et al), a practical electrostatic transducer which exploits the foregoing phenomenon can easily be constructed and operated at values of Pd which are significantly less than the value of Pd required to achieve the minimum breakdown voltage of the particular gas maintained between the transducer plates. In such devices, an elastomeric dielectric material is placed between plates 10, 12 of the FIG. 1 electrostatic transducer and is maintained in contact with both plates. It is of course well known to provide a dielectric material between a pair of opposed plates across which a voltage potential difference is maintained (as in a conventional capacitor). However, if the dielectric material has very slight surface irregularities or pockets, and is elastomeric (for example, neoprene rubber), then the desired increase in gap breakdown voltage can be achieved, thereby facilitating production of transducers having substantially greater electrostatic forces per unit area.

Typically, a neoprene rubber dielectric (not shown) having a breakdown field of about $2 \times 10^7$ volts per meter is disposed between plates 10, 12 and in contact therewith. The rubber surfaces are very slightly irregular such that, when viewed on the microscopic scale, they exhibit a large plurality of pockets having an approximate average depth "d" of about 10 microns each. Accordingly, when such a dielectric is disposed between the transducer plates a corresponding large plurality of discrete gaps on the order of about 10 microns are provided between each plate and the adjacent surface of the rubber dielectric.

The innumerable slight irregularities on the dielectric's surface effectively comprise a gap of about 10 microns between the transducer plates and the adjacent faces of the dielectric material. As indicated above, such small gaps are capable of sustaining relatively high voltages before breakdown occurs. Moreover, because the dielectric material is elastomeric, the transducer plates are able to oscillate significantly in response to the large electrostatic forces which correspond to the large voltages sustainable by the dielectric's slight surface irregularities. The gap width of about 10 microns is a "time-averaged" width, in the sense that the gap repeatedly widens and narrows as the elastomer is deformed during oscillation of the transducer.

There have been many applications of such textured elastomeric dielectrics in different configurations, but all suffer from the problem that as the plate separation distance decreases, air must be compressed within the many small irregularities on the dielectic's surface. To understand the significance of this problem, it is necessary to discuss the approximate magnitudes of a variety of mechanical impedances. In this regard, because we are dealing with roughly planar surfaces, it is appropriate to speak in terms of mechanical impedances per unit area; that is, the ratio of force per unit area (i.e. pressure) to velocity. As is well known, for reasonably small oscillations, most systems behave approximately linearly, such that the mechanical impedance of both planar surfaces and acoustic media are well defined concepts which depend on frequency, and certain physical constants.

For air, for example, the mechanical impedance per unit area, z, is given by:

$$z_{air} = \rho c \quad (2)$$

where $\rho$ is the density of air (approximately 1.20 kg/m$^3$) and c is the speed of sound in air (approximately 342 metres per second at 20° C. and 760 mmHg). Thus, Equation 2 yields a value of $z_{air}$ of 410 (N/m$^2$)/(m/sec).

The mechanical impedance per unit area of an air gap is given by:

$$z_{gap} = P_{atm}/2\pi f d_{gap} \quad (3)$$

where $P_{atm}$ is atmospheric pressure ($1.013 \times 10^5$ N/m$^2$), $d_{gap}$ is the thickness of the air gap, and f is the frequency of the oscillation. At a typical frequency of 10 kHz and for a typical desirable time-averaged gap width of 5 microns, (i.e. somewhat less than the Paschen minimum distance of 16 microns), Equation 3 yields a value for $Z_{gap}$ of $3.22 \times 10^5$ (N/m$^2$)/(m/sec), which is approximately 800 times larger than the mechanical impedance per unit area of air. This very large mismatch is what makes the transducer described in U.S. Pat. No. 4,885,783 intrinsically unsuitable for producing sound in air. (It is interesting to note that the mechanical impedance of water is much closer to the transducer's mechanical impedance, which explains why the transducer of U.S. Pat. No. 4,885,783 works well for producing sound in water).

In practice it is neither necessary nor desirable to strive to obtain a mechanical impedance per unit area quite as low as that for air, because in many applications this would necessitate a transducer which would be so physically weak that it could too easily be damaged by routine use. In other words, a practical requirement is that the surface of a transducer used to impart vibrations to air should be reasonably robust. For example, the surface could be composed of 50 micron thick titanium alloy sheet, with titanium being selected to provide a high ratio of strength to mass, as well as resistance to chemical attack. Such a sheet has a mass per unit area of 0.225 kg/m$^2$. The mechanical impedance per unit area associated with the mass of a sheet is given by:

$$z_{mass} = 2\pi f m_{sheet} \quad (4)$$

where $z_{mass}$ is the mechanical impedance per unit area associated with deflecting the mass, f is the frequency of the mechanical oscillation, and $m_{sheet}$ is the mass per unit area of the sheet. At a typical frequency of 10 kHz, Equation 4 yields a mechanical impedance per unit area for a 50 micron thick titanium sheet of about 14,100 (N/m$^2$)/(m/sec), which is about 35 times greater than that for air.

If it is desired to have an air gap whose impedance is comparable to the foregoing value, Equation 3 can be solved to show that at 10 kHz, the gap would have to be roughly 0.1 mm (i.e. 100 microns) thick. But, this thickness is very substantially beyond the thickness corresponding to the Paschen minimum distance of FIG. 2.

One solution which might be considered, but which does not work, is to allow the gas to flow from the gap to the region outside the transducer; or, to flow into the gap from such region as the sheet transducer oscillates. This is impractical because such gas flow would have to occur very rapidly; namely, at a flow rate which could not be achieved, due to the viscous damping of the gas. Moreover, even if the requisite gas flow rate could be achieved, in many applications such gas flow into and out of the transducer would negate the desired operation of the device by producing a secondary sound wave which would cancel the intended wave. For both of these reasons it is essential to maintain the effective gap size as described; that is, roughly 0.1 mm (i.e. 100 microns) thick.

We thus face two apparently conflicting transducer design criteria. On one hand, the gap between the transducer plates is preferably made as small as possible (about 5 microns on a time-averaged basis) in order to achieve large breakdown fields and hence large electrostatic pressures. On the other hand, the gap between the transducer plates is preferably made as large as possible (i.e. 0.1 mm) in order to avoid the problem of compressing a gas within a small gap, and thus allow the transducer's mechanical impedance per unit area to be closer to that of air.

Figure 3:
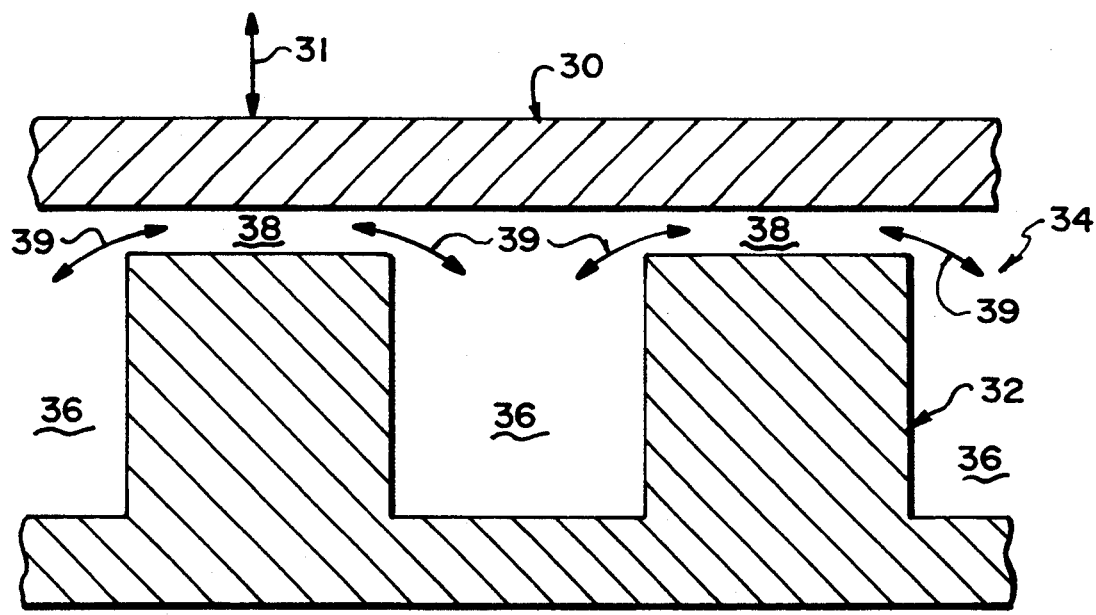
FIG. 3 is a greatly enlarged cross-sectional side elevation view of a portion of a transducer constructed in accordance with the preferred embodiment of the invention.

FIG. 3 shows schematically how one may simultaneously achieve the desirable features of both small and large gaps. Specifically, FIG. 3 shows in cross-section opposed first and second sheets 30, 32 which together define a gas filled gap 34. First sheet 30 is flat, but second sheet 32 is textured such that gap 34 consists of a plurality of thick regions 36 and thin regions 38. In a typical example, the total "projected area" of thin regions 38 (i.e. the sum of the areas in which a notional cross-sectional plane parallel to sheets 30, 32 intersects the thin regions) may be about the same as the total projected area of thick regions 36 (i.e. the sum of the areas in which the aforesaid notional plane intersects the thick regions), such that the mechanical impedance of the overall gap 34 is approximately that of the average thickness; that is, the mean of the thickness of thick and thin regions 36, 38. The reason for this is that as sheet 30 oscillates as depicted by double-headed arrow 31, the gas which would otherwise have to be rarefied and compressed in thin regions 38 can instead flow alternately into and out of thin regions 38; and, out of and into thick regions 36, as depicted by double-headed arrows 39. In other words, the width of each of the thin regions is less than the width at which gas flow into and out of the thin regions can substantially increase the transducer's net mechanical impedance per unit area at frequencies within the transducer's intended operating frequency range. The maximum electrostatic force associated with thin regions 38 can easily be 100 to 1,000 times greater than that attainable with thick regions 36 alone. The fact that only about 50% of the area of the transducer can be made up of such thin regions is a small price to pay for such a significant increase in maximum electrostatic pressure.

Figures 4A, 4B:
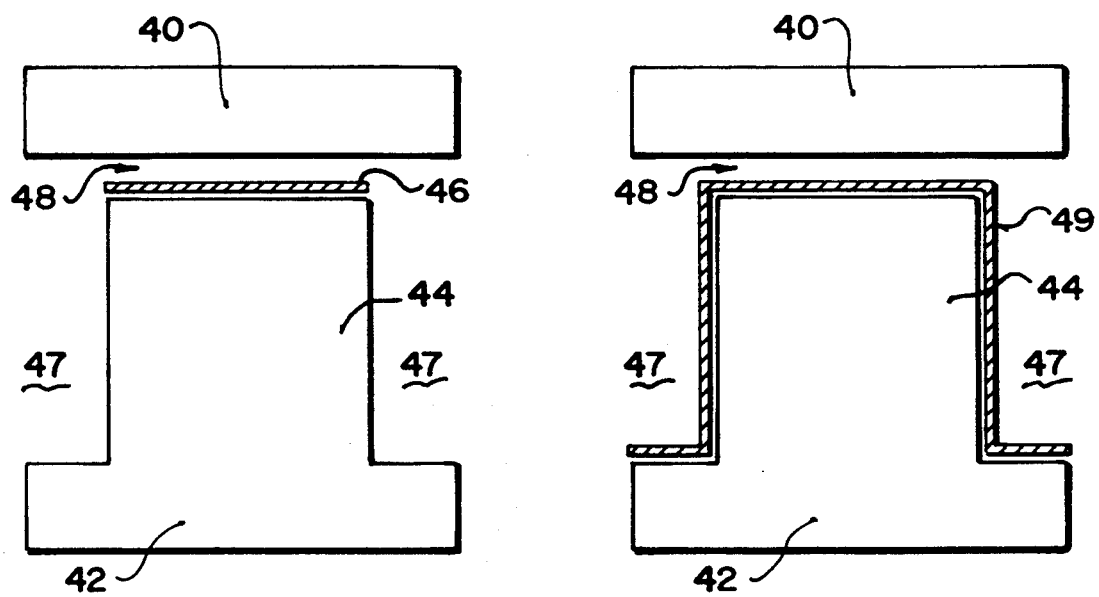
FIGS. 4A and 4B illustrate alternative techniques for applying a conductive surface to one of the opposed sheets comprising the FIG. 3 structure.

In order to take advantage of the principles described above with reference to FIG. 3, the invention provides several additional features. First, it is important that the electrostatic field energy be concentrated in thin regions 38; both to optimize the efficiency of the transducer, and to reduce the possibility of electrical breakdown in thick regions 36, which are incapable of supporting large electric fields. FIG. 4 shows how this can be achieved by providing conductive surfaces on the inner faces of the transducer sheets. Specifically, in FIG. 4A, upper sheet 40 is entirely conductive; and, a conductive surface 46 is applied to lower sheet 42 in discrete strips located only on the flat tops of ridges 44 on sheet 42, such that conductive strips 46 are entirely located within thin regions 48, and not within thick regions 47.

Although the FIG. 4A technique effectively constrains the electrostatic field energy to thin regions 48 as desired, it may in certain circumstances be easier to use the technique shown in FIG. 4B, in which the entire surface of sheet 42 is covered with conductive material in the form of conductive sheet 49. Despite the fact that sheet 49 borders both thin regions 48 and thick regions 47, most of the electrostatic energy is still concentrated in thin regions 48 because the field energy density is proportional to the square of the field, and the field itself is inversely proportional to the thickness of the gap. For example, if thin regions 48 are 1/10th the thickness of thick regions 47, they would have 10 times the field, and 100 times the electrostatic energy density; so, although thin regions 48 are only 1/10th as thick as thick regions 47, 90% of the field energy would still be concentrated within thin regions 48. Providing the fields are not too high, the lower fields in thick regions 47 may be sufficiently low that breakdown will not occur, so that this technique would work.

The specific technique used to concentrate the electrostatic field energy in the thin regions is not important. All that matters is that some such technique be employed to ensure the efficiency of the transducer. Those skilled in the art will be able to devise techniques alternative to those described above in relation to FIGS. 4A and 4B.

Figure 5:
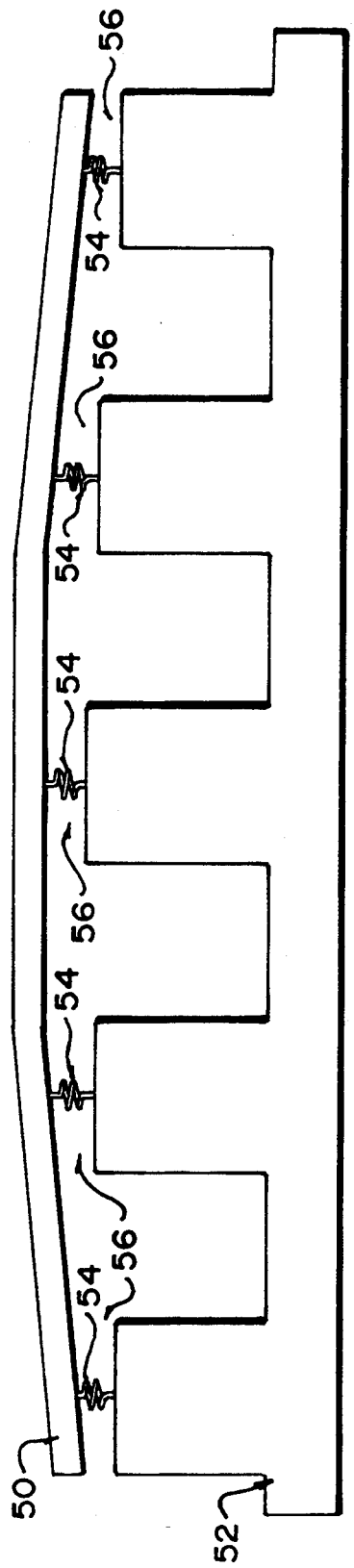
FIG. 5 is a schematic illustration showing how the separation distance between the opposed sheets comprising the FIG. 3 structure can be maintained reasonably consistently at a desired dimension.

It will be appreciated that the typical desired dimension of 5 microns for the thickness of the thin regions is very small relative to the typical accuracies with which ordinary surfaces are made, and is exceedingly small compared to the typical accuracies with which ordinary surfaces are positioned. The invention provides a means of overcoming this practical difficulty. For the transducer to perform as has been described, it is not in fact necessary for the flatness inaccuracy or position inaccuracy of the surface to be substantially less than the typical desired thin gap thickness of 5 microns. All that matters is that within any given thin region the separation between the transducer sheets be maintained reasonably consistently at the desired dimension. FIG. 5 shows schematically how this can be achieved. Lower, textured sheet 52 is relatively inflexible and is shown to have exaggerated dimensional errors (represented by the different heights of the upwardly protruding flat-topped ridges on sheet 52). Flat upper sheet 50 is comparatively flexible on the size scale of the errors in sheet 52. Numerous "localized positioning means" 54 are provided to maintain the correct dimension for the thin gap regions 56 (i.e. the distance between the inner face of sheet 50 and the adjacent faces of the flat-topped upwardly protruding ridges on sheet 52). Localized positioning means 54 must not interfere with the electrical operation of the transducer. They must also be flexible so that oscillations of the transducer can still occur. Those skilled in mechanical and micro-mechanical design will be able to devise numerous arrangements for achieving such localized flexible positioning means, one of which is described below, but all of which fall within the scope of this invention.

If the transducer is to achieve the desired mechanical impedance per unit area, gas must be able to flow from the thin regions into the thick regions and back as the transducer oscillates. The necessity of such gas flow gives rise to additional mechanical impedance. This impedance arises both from the mass of the moving air (which contributes to a greater relative extent than the mass of the sheets, because the air moves a greater distance); and, from the viscous drag of the air moving against stationary surfaces. Both of these aerodynamic sources of mechanical impedance per unit area will increase with increased width of the thin regions. Therefore, to ensure that this impedance does not substantially degrade operation of the transducer, it will typically be necessary to appropriately restrict the width of the thin regions. For the exemplary cases described below, the most practical designs shown have typical values for the width of the thin regions which are smaller than this limiting value. In other cases, it may be necessary to carry out detailed aerodynamic calculations involving viscous drag and inertial effects to establish that this is in fact the case.

Those skilled in the art will appreciate that the optimum design of a transducer embodying the invention depends upon the transducer's intended usage and upon associated trade offs between physical strength, desired coupling efficiency to the selected medium (which will have a characteristic mechanical impedance), frequency, desired amplitude of oscillation, etc. There are no specific guidelines which will adequately cover every case, but several design criteria are desirably incorporated in practical embodiments of the invention. For example, as mentioned above, it is highly desirable for the thickness of the thin regions to be substantially less than the Paschen minimum distance for the gas and gas pressure in the gap of the transducer in question, in order to allow enhanced electrostatic fields to be present.

Once the mass per unit area of the transducer's vibrating sheet is determined, it will be desirable to select a thickness for the thick regions of the gas filled gap which is large enough that the net mechanical impedance per unit area associated with compressing the gas in the gap is of the same order as or smaller than the mechanical impedance per unit area associated with vibrating the mass per unit area.

Once a target is established for the thickness of the thin and thick gas filled gap regions, practical design considerations will strongly suggest the typical width dimensions for the thin and thick regions. Typically, the thin and thick regions will have approximately the same total area and their typical widths will be on the order of the thickness of the gas filled gap in the thick regions. In addition to such practical dimensional considerations, however, it is also highly advantageous to ensure that the typical width of the thin regions is small enough that the viscosity and inertia of gas flowing into and out of these regions does not substantially increase the net mechanical impedance per area of the transducer in its intended operating conditions.

Similarly, although a variety of flexible positioning means can be envisioned (one example being described below), it is highly desirable that whatever means is used is sufficiently flexible to ensure that the stiffness of the positioning means does not substantially reduce the output of the transducer. In other words, the net mechanical impedance per unit area associated with forces arising from the positioning means should be of the same order or less than the net mechanical impedance per unit area associated with the mass per unit area of the transducer sheets under their intended operating conditions.

Figure 6B:
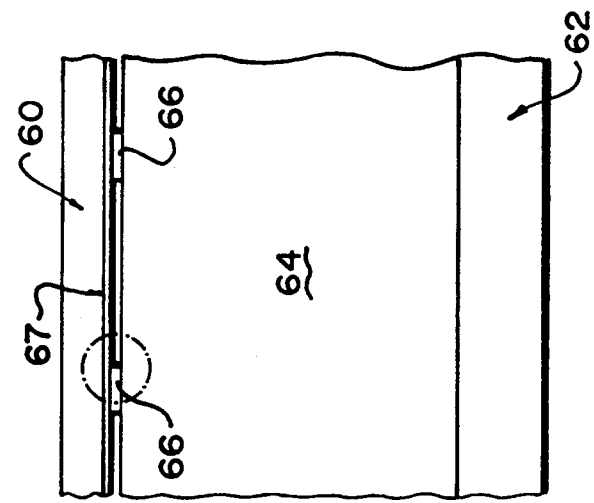
FIGS. 6A and 6B are respectively cross-sectional side and end elevation views, on a greatly enlarged scale, of a transducer constructed in accordance with the preferred embodiment of the invention.
Figure 6A:
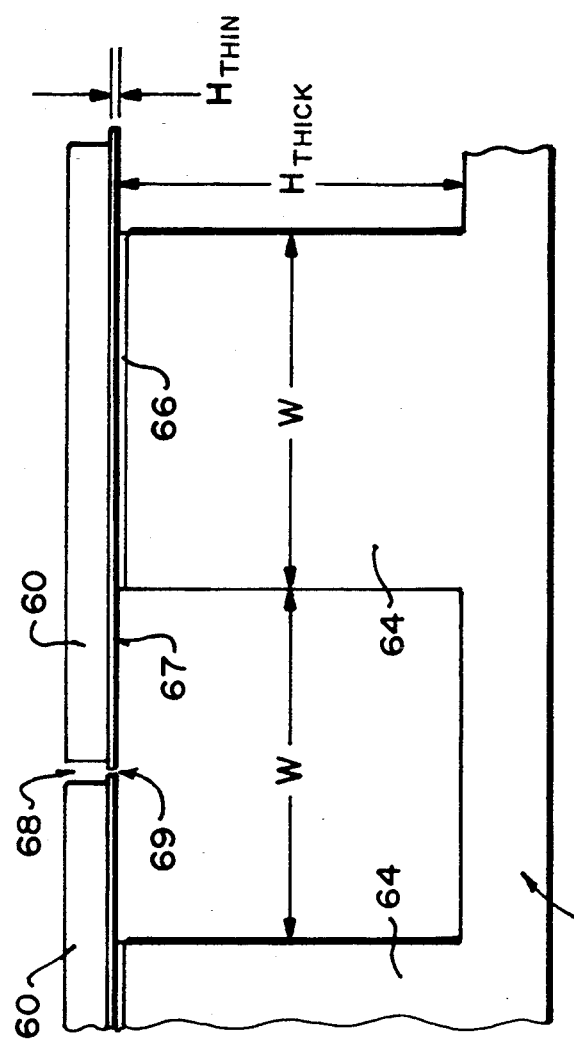
Figure 6C:
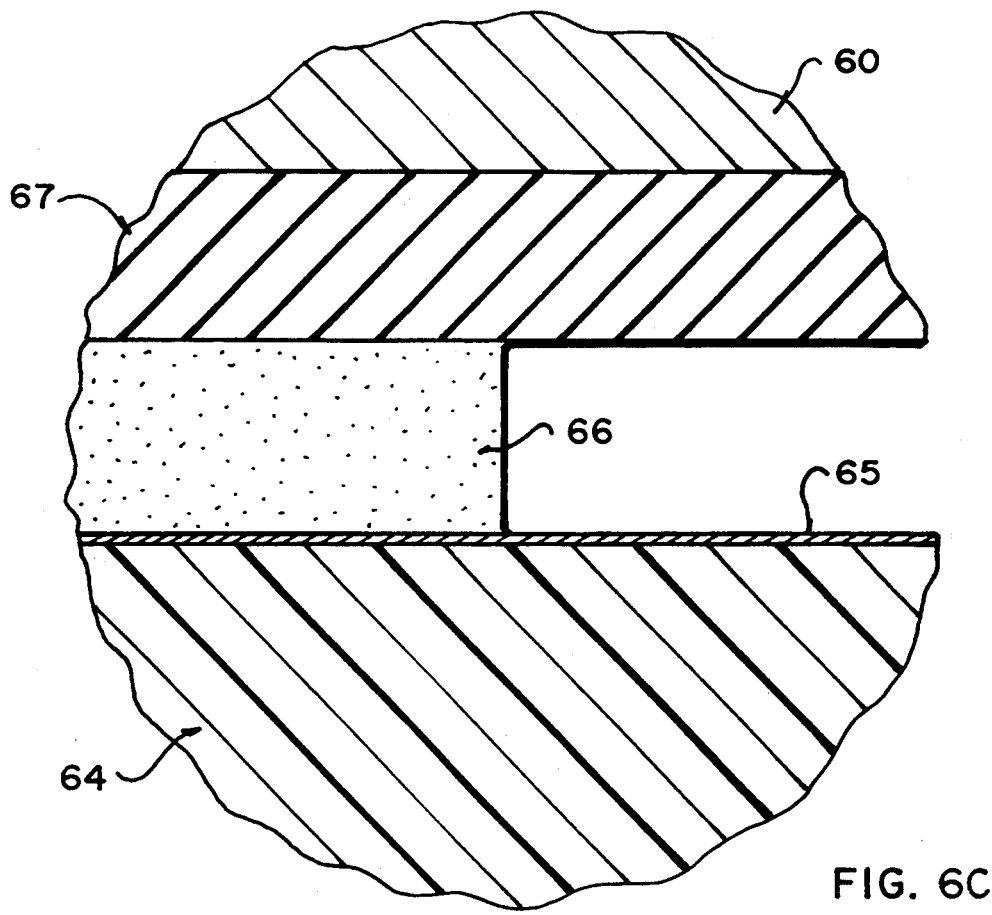
FIG. 6C is a further enlarged view of the encircled portion of the FIG. 6B structure.

FIGS. 6A, 6B and 6C depict a preferred embodiment of the invention. FIG. 6A is a side view showing only two of the numerous upwardly protruding flat-topped linear ridges 64 on lower sheet 62 which define the transducer's thin and thick regions relative to flat upper sheet 60, as described above. FIG. 6B is an end view of the same structure. FIG. 6C is an enlarged view of the encircled portion of FIG. 6B. Sheet 62 is made of silicone rubber. The thin and thick regions are each typically 400 microns wide (dimension "W" in FIG. 6A). The thick regions are also typically 400 microns thick (dimension "$H_{thick}$" in FIG. 6A) The thin regions are typically 5 microns thick (dimension "$H_{thin}$" in FIG. 6A). A plurality of conductive strips 65 (FIG. 6C) are deposited atop ridges 64 as described above in relation to FIG. 4A. Strips 65 may comprise a vacuum deposited layer, typically gold, which is sufficiently thin that it remains adhered to and does not change the flexibility of the silicone rubber comprising sheet 62. Strips 65 are electrically connected together to form a single conductive "surface" on lower sheet 62.

Upper sheet 60 is a 50 micron thick sheet of electrically conductive titanium alloy which constitutes a fairly low mass, relatively robust external surface for providing vibrations in air. The inward face of upper sheet 60 bears a thin insulating coating 67 which reduces the possibility of catastrophic failure of the transducer, should a manufacturing flaw result in a localized error in the dimensions and hence allow electrical breakdown to occur. Sheet 60 is provided with a plurality of breathing holes 68 which are large enough to allow the pressure of the gas trapped between sheets 60, 62 to equilibrate with the gas pressure external to the transducer at frequencies substantially below the transducer's intended operating frequency range; but small enough that, at the transducer's operating frequency, very little gas flows into or out of these holes. Typically, the diameter of holes 68 may be 1 to 10 microns. Alternatively, holes 68 may be of a larger diameter, if they are filled with a porous plug or covered with a porous membrane, to achieve the same net effect.

The use of rubber to form the bulk of sheet 62 is beneficial for two reasons. First, it helps to ensure that there is sufficient flexibility for the localized positioning means to appropriately fix the desired thickness of the thin regions, without the positioning means having to be extraordinarily strong, which therefore means that it need not be very stiff. Second, by taking advantage of the flexibility of the rubber itself, one may design a simple but effective flexible localized positioning means. This can be understood with respect to the end view in FIG. 6B, in which the localized positioning means takes the form of a series of adhesive spacing strips 66 having a thickness $H_{thin}$ equal to the desired thickness of the thin region; and, a width great enough that a reasonable bond strength can be achieved between strips 66 and the top surface of ridges 64, yet small enough that the strips 66 do not cover a substantial portion of the area of the thin region. Strips 66 need not be elastomeric, since the compressibility of such material on the size scale of strips 66 would be negligible anyway. Rather, the flexibility associated with strips 66 results from the deformability of the rubber substrate underneath. With the dimensions as shown, using typical elastomeric materials, the net stiffness associated with the deformation of the rubber in this case will be comparable to the stiffness associated with the air compression, and is thus acceptable. Many variations of this design concept are possible and will have different advantages in different situations. For example, it may be desirable not to require strips 66 themselves to be good electrical insulators, and it may therefore be desirable to configure the conductive surfaces to avoid intense electric fields in the vicinity of strips 66. In some cases strips 66 may not need to be adhesive per se, since there may be available an external positioning force, such that strips 66 need only apply compressive resistance rather than adhesion.

Sheet 62 need not be formed with parallel, flat-topped ridges like those shown in FIG. 6A. Alternative structures capable of achieving the principles described above will doubtless occur to those skilled in the art.

Figure 7:
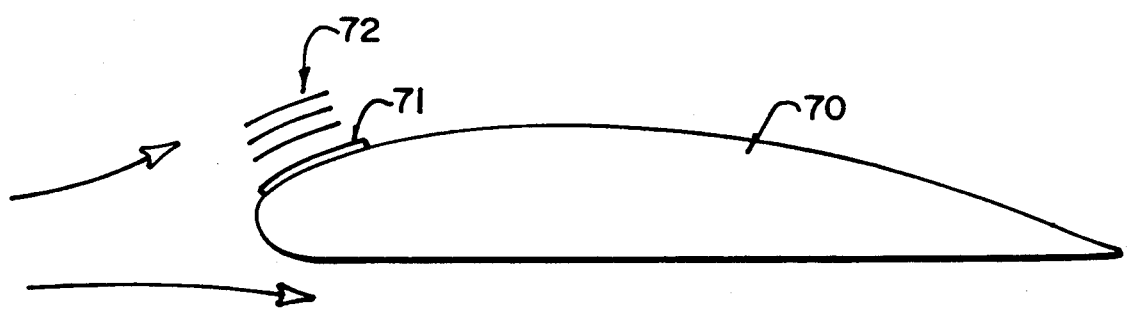
FIG. 7 shows how the invention can be applied to modify the characteristics of air flow over a rigid surface such as an airplane wing.

One important application of the invention, depicted in FIG. 7, is as a means for modifying aerodynamic flow over a rigid surface such as wing 70. This is achieved by applying transducer 71 (constructed as described above in relation to FIGS. 6A and 6B) to a portion of the wing's surface, and then applying a controlled electrical signal to the transducer, thereby causing a controlled acoustical excitation 72 in the air flow. The specific design described above in relation to FIGS. 6A and 6B comprises many of the characteristics which are desirable in such an application; namely, low overall thickness, relatively high efficiency, relatively low weight, an external surface which is relatively robust, and a capability of producing sound levels at a frequency and intensity suitable for modifying aerodynamic flow. Specifically, the design shown is capable of producing acoustic excitations of approximately 120 db at $10^4$ hertz, which under certain circumstances has been shown to change the characteristics of the transitions to turbulence of air flow over a wing, and of the separation of flow over the wing, in manners which can be advantageous for a variety of reasons. Again, depending on the flow characteristics in question and the desired effects, a variety of different configurations may be employed, and can be easily devised using the methods and structures described herein.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrostatic transducer having an intended operating frequency range and comprising:
   (a) first and second sheets separated by a gas-filled gap, each of said sheets having a conductive surface for imposing electric fields within said gap;
   (b) flexible positioning means disposed between said sheets for maintaining a desired average thickness of said gap; said gap comprising a plurality of thick regions and a plurality of thin regions, wherein:
      (i) said thin regions have a total projected area comprising a substantial portion of one of said sheets' total area;
      (ii) said thick regions have a total projected area also comprising a substantial portion of one of said sheets' total area;
      (iii) said gap has an average thickness in said thick regions at least ten times greater than said gap's average thickness in said thin regions; and,
      (iv) means for concentrating said electric fields' electrostatic field energy in said thin regions;
   wherein:
   (c) said gas has a gas pressure in said gap;
   (d) said gap thickness in said thin regions is less than or equal to the Paschen minimum distance for said gas and said gas pressure;
   (e) said sheets have:
      (i) a component $z_{gap}$ of net mechanical impedance per unit area due to pressure changes required to compress and rarefy said gas within said gap;
      (ii) a component $z_{mass}$ of net mechanical impedance per unit area due to said sheets' mass;
   (f) said gap thickness in said thick regions is sufficiently large that said component $z_{gap}$ has a magnitude of the same order as, or less than the magnitude of said component $z_{mass}$ at frequencies within said transducer's intended operting frequency range;
   (g) each of said thin regions have a width less than the width at which gas glow into and out of said thin regions can substantially increase said transducer's net mechanical impedance per unit area at frequencies within said transducer's intended operating frequency range;
   (h) said positioning means has a net mechanical impedance per unit area $z_{pos}$; and
   (i) $z_{pos}$ has a magnitude of the same order as, or less than the magnitude of said component $z_{mass}$ for frequencies within said transducer's intended operating frequency range.

2. An electrostatic transducer as defined in claim 1, wherein said positioning means comprises an elastomeric material.

3. An electrostatic transducer as defined in claim 2, wherein:
   (a) said gas has a gas pressure in said gap; and,
   (b) said transducer further comprises means for equalizing said gas pressure in said gap with a gas pressure external to said transducer, at frequencies substantially below said transducer's intended operating frequency range.

4. An electrostatic transducer as defined in claim 3, wherein one of said sheets comprises an elastomeric material bearing a conductive coating, said coating having a thickness less than that which significantly impede flexibility of said coated sheet.

5. An electrostatic transducer as defined in claim 4, wherein said conductive surface on at least one of said sheets is coated with a thin ceramic for electrically isolating said surface from said gap.

6. An electrostatic transducer having an intended operating frequency range and comprising:
   (a) first and second sheets separated by a gas-filled gap, each of said sheets having a conductive surface for imposing electric fields within said gap;
   (b) flexible positioning means disposed between said sheets for maintaining a desired average thickness of said gap; said gap comprising a plurality of thick regions and a plurality of thin regions, wherein:
      (i) said thin regions have a total projected area comprising a substantial portion of one of said sheets' total area;
      (ii) said thick regions have a total projected area also comprising a substantial portion of one of said sheets' total area;
      (iii) said gap has an average thickness in said thick regions at least ten times greater than said gap's average thickness in said thin regions; and,
      (iv) means for concentrating said electric fields' electrostatic field energy in said thin regions;
   wherein:
   (c) said gas has a gas pressure in said gap;
   (d) said gap thickness in said thin regions is less than or equal to the Paschen minimum distance for said gas and said gas pressure;
   (e) said positioning means has a net mechanical impedance per unit area $z_{pos}$;
   (f) said sheets have a component $z_{mass}$ of net mechanical impedance per unit area due to said sheets' mass; and,
   (g) $z_{pos}$ has a magnitude of the same order as, or less than the magnitude of said component $z_{mass}$ for frequencies within said transducer's intended operating frequency range.

7. An electrostatic transducer having an intended operating frequency range and comprising:
   (a) first and second sheets separated by a gas-filled gap, each of said sheets having a conductive surface for imposing electric fields within said gap;
   (b) flexible positioning means disposed between said sheets for maintaining a desired average thickness of said gap; said gap comprising a plurality of thick regions and a plurality of thin regions, wherein:

(i) said thin regions have a total projected area comprising a substantial portion of one of said sheets' total area;
(ii) said thick regions have a total projected area also comprising a substantial portion of one of said sheets' total area;
(iii) said gap has an average thickness in said thick regions at least ten times greater than said gap's average thickness in said thin regions;
(iv) means for concentrating said electric fields' electrostatic field energy in said thin regions; wherein:
(c) said gas has a gas pressure in said gap;
(d) said gap thickness in said thin regions is less than or equal to the Paschen minimum distance for said gas and said gas pressure;
(e) each of said thin regions have a width less than the width at which gas flow into and out of said thin regions can substantially increase said transducer's net mechanical impedance per unit area at frequencies within said transducer's intended operating frequency range;
(f) said positioning means has a net mechanical impedance per unit area $z_{pos}$;
(g) said sheets have a component $z_{mass}$ of net mechanical impedance per unit area due to said sheets' mass; and,
(h) $z_{pos}$ has a magnitude of the same order as, or less than the magnitude of said component $z_{mass}$ for frequencies within said transducer's intended operating frequency range.

8. An electrostatic transducer having an intended operating frequency range and comprising:
(a) first and second sheets separated by a gas-filled gap, each of said sheets having a conductive surface for imposing electric fields within said gap;
(b) flexible positioning means disposed between said sheets for maintaining a desired average thickness of said gap; said gap comprising a plurality of thick regions and a plurality of thin regions, wherein:
(i) said thin regions have a total projected area comprising a substantial portion of one of said sheets' total area;
(ii) said thick regions have a total projected area also comprising a substantial portion of one of said sheets' total area;
(iii) said gap has an average thickness in said thick regions at least ten times greater than said gap's average thickness in said thin regions;
(iv) means for concentrating said electric fields' electrostatic field energy in said thin regions; wherein:
(c) said gas has a gas pressure in said gap;
(d) said sheets have:
(i) a component $z_{gap}$ of net mechanical impedance per unit area due to pressure changes required to compress and rarefy said gas within said gap;
(ii) a component $z_{mass}$ of net mechanical impedance per unit area due to said sheets' mass;
(e) said gap thickness in said thick regions is sufficiently large that said component $z_{gap}$ has a magnitude of the same order as, or less than the magnitude of said component $z_{mass}$ at frequencies within said transducer's intended operating frequency range;
(f) said positioning means has a net mechanical impedance per unit area $z_{pos}$; and (g) $z_{pos}$ has a magnitude of the same order as, or less than the magnitude of said component $z_{mass}$ for frequencies within said transducer's intended operating frequency range.

9. An electrostatic transducer as defined in claim 8, wherein each of said thin regions have a width less than the width at which gas glow into and out of said thin regions can substantially increase said transducer's net mechanical impedance per unit area at frequencies within said transducer's intended operating frequency range.

10. An electrostatic transducer as defined in claim 8, wherein said gap thickness in said thin regions is less than or equal to about twice the Paschen minimum distance for said gas and said gas pressure.

11. An electrostatic transducer having an intended operating frequency range and comprising:
(a) first and second sheets separated by a gas-filled gap, each of said sheets having a conductive surface for imposing electric fields within said gap;
(b) flexible positioning means disposed between said sheets for maintaining a desired average thickness of said gap; said gap comprising a plurality of thick regions and a plurality of thin regions, wherein:
(i) said thin regions have a total projected area comprising a substantial portion of one of said sheets' total area;
(ii) said thick regions have a total projected area also comprising a substantial portion of one of said sheets' total area;
(iii) said gap has an average thickness in said thick regions at least ten times greater than said gap's average thickness in said thin regions;
(iv) means for concentrating said electric fields' electrostatic field energy in said thin regions; wherein:
(c) said gas has a gas pressure in said gap;
(d) each of said thin regions have a width less than the width at which gas flow into and out of said thin regions can substantially increase said transducer's net mechanical impedance per unit area at frequencies within said transducer's intended operating frequency range;
(e) said positioning means has a net mechanical impedance per unit area $z_{pos}$;
(f) said sheets have a component $z_{mass}$ of net mechanical impedance per unit area due to said sheets' mass; and,
(g) $z_{pos}$ has a magnitude of the same order as, or less than the magnitude of said component $z_{mass}$ for frequencies within said transducer's intended operating frequency range.

12. An electrostatic transducer as defined in claim 11, wherein said gap thickness in said thin regions is less than or equal to about twice the Paschen minimum distance for said gas and said gas pressure.

13. An electrostatic transducer having an intended operating frequency range and comprising:
(a) first and second sheets separated by a gas-filled gap, each of said sheets having a conductive surface for imposing electric fields within said gap;
(b) flexible positioning means disposed between said sheets for maintaining a desired average thickness of said gap comprising a plurality of thick regions and a plurality of thin regions, wherein:
(i) said thin regions have a total protected area comprising a substantial portion of one of said sheets' total area;

(ii) said thick regions have a total protected area also comprising a substantial portion of one of said sheets' total area;

(iii) said gap has an average thickness in said thick regions at least ten times greater than said gap's average thickness in said thin regions;

(iv) means for concentrating said electric fields' electrostatic field energy in said thin regions; wherein:

(c) said gas has a gas pressure in said gap;

(d) said positioning means has a net mechanical impedance per unit area $z_{pos}$;

(e) said sheets have a component $z_{mass}$ of net mechanical impedance per unit area due to said sheets' mass; and, (f) $z_{pos}$ has a magnitude of the same order as, or less than the magnitude of said component $z_{mass}$ for frequencies within said transducer's intended operating frequency range.

14. An electrostatic transducer as defined in claim 13, wherein said gap thickness in said thin regions is less than or equal to about twice the Paschen minimum distance for said gas and said gas pressure.

15. An electrostatic transducer having an intended operating frequency range and comprising:

(a) first and second sheets separated by a gas-filled gap, each of said sheets having a conductive surface for imposing electric fields within said gap;

(b) flexible positioning means disposed between said sheets for maintaining a desired average thickness of said gap; said gap comprising a plurality of thick regions and a plurality of thin regions, wherein:

(i) said thin regions have a total projected area comprising a substantial portion of one of said sheets' total area;

(ii) said thick regions have a total projected area also comprising a substantial portion of one of said sheets' total area;

(iii) said gap has an average thickness in said thick regions at least ten times greater than said gap's average thickness in said thin regions;

(iv) means for concentrating said electric fields' electrostatic field energy in said thin regions; wherein:

(c) said gas has a gas pressure in said gap;

(d) said gap thickness in said thin regions is less than or equal to the Paschen minimum distance for said gas and said gas pressure;

(e) said sheets have:

(i) a component $z_{gap}$ of net mechanical impedance per unit area due to pressure changes required to compress and rarefy said gas within said gap;

(ii) a component $z_{mass}$ of net mechanical impedance per unit area due to said sheets' mass;

(f) said gap thickness in said thick regions is sufficiently large that said component $z_{gap}$ has a magnitude of the same order as, or less than the magnitude of said component $z_{mass}$ at frequencies within said transducer's intended operating frequency range;

(g) said positioning means has a net mechanical impedance per unit area $z_{pos}$; and (h) $z_{pos}$ has a magnitude of the same order as, or less than the magnitude of said component $z_{mass}$ for frequencies within said transducer's intended operating frequency range.

16. An electrostatic transducer having an intended operating frequency range and comprising:

(a) first and second sheets separated by a gas-filled gap, each of said sheets having a conductive surface for imposing electric fields within said gap;

(b) flexible positioning means disposed between said sheets for maintaining a desired average thickness of said gap; said gap comprising a plurality of thick regions and a plurality of thin regions, wherein:

(i) said thin regions have a total projected area comprising a substantial portion of one of said sheets' total area;

(ii) said thick regions have a total projected area also comprising a substantial portion of one of said sheet' total area;

(iii) said gap has an average thickness in said thick regions at least ten times greater than said gap's average thickness in said thin regions;

(iv) means for concentrating said electric fields' electrostatic field energy in said thin regions; wherein:

(c) said gas has a gas pressure in said gap;

(d) said sheets have:

(i) a component $z_{gap}$ of net mechanical impedance per unit area due to pressure changes required to compress and rarefy said gas within said gap;

(ii) a component $z_{mass}$ of net mechanical impedance per unit area due to said sheets' mass;

(e) said gap thickness in said thick regions is sufficiently large that said component $z_{gap}$ has a magnitude of the same order as, or less than the magnitude of said component $z_{mass}$ at frequencies within said transducer's intended operating frequency range;

(f) said positioning means has a net mechanical impedance per unit area $z_{pos}$;

(g) $z_{pos}$ has a magnitude of the same order as, or less than the magnitude of said component $z_{mass}$ for frequencies within said transducer's intended operating frequency range; and, (h) each of said thin regions have a width less than the width at which gas flow into and out of said thin regions can substantially increase said transducer's net mechanical impedance per unit area at frequencies within said transducer's intended operating frequency range.

17. An electrostatic transducer as defined in claim 16, wherein said gap thickness in said thin regions is less than or equal to about twice the Paschen minimum distance for said gas and said gas pressure.

* * * * *